United States Patent [19]

Taylor

[11] Patent Number: 4,546,994
[45] Date of Patent: Oct. 15, 1985

[54] UNIVERSAL TRAILER HITCH

[76] Inventor: Jake E. Taylor, 7091 Tamarack Dr., Hubbard, Ohio 44425

[21] Appl. No.: 545,435

[22] Filed: Oct. 26, 1983

[51] Int. Cl.$^4$ .............................................. B60D 1/06
[52] U.S. Cl. ........................... 280/423 R; 280/415 R; 280/511
[58] Field of Search ........... 280/423 R, 423 A, 423 B, 280/415 R, 415 A, 415 B, 433, 504, 511, 512, 439, 441

[56] References Cited

U.S. PATENT DOCUMENTS

| | | | |
|---|---|---|---|
| 3,433,503 | 3/1969 | Davis | 280/512 |
| 3,527,476 | 9/1970 | Winckler | 280/423 R |
| 3,659,876 | 5/1972 | Melton | 280/511 |
| 3,790,188 | 2/1974 | Johannes | 280/423 R |
| 3,820,821 | 6/1974 | Leland | 280/423 R |
| 3,826,516 | 7/1974 | Weber | 280/423 R X |
| 3,893,713 | 7/1975 | Ivy | 280/511 |
| 4,256,324 | 3/1981 | Hamilton | 280/433 |

FOREIGN PATENT DOCUMENTS 2846080  4/1979  Fed. Rep. of Germany ... 280/423 A

Primary Examiner—Joseph F. Peters, Jr.
Assistant Examiner—Mitchell J. Hill
Attorney, Agent, or Firm—Harpman & Harpman

[57] ABSTRACT

A universal trailer hitch assembly provides a variety of trailer hitch pin configurations to be secured to a load bed of a pickup truck and includes an under load bed support frame secured to a reinforcing plate within the load bed. The support frame is bolted to the truck frame and has a locking hitch mechanism secured thereto providing easy removal of the hitch pin configuration held by said hitch assembly.

5 Claims, 4 Drawing Figures

UNIVERSAL TRAILER HITCH

BACKGROUND OF THE INVENTION

1. Field of the Invention

The present invention relates to an interchangeable trailer hitch pin assembly for pickup trucks and the like in which the trailer hitch is secured within the load bed of the pickup truck so that trailers can be removably secured thereto.

2. Description of the Prior Art

Prior art devices of this type have relied on a variety of different hitch designs. See for example U.S. Pat. Nos. 3,659,876, 3,433,503 and 4,256,324.

In U.S. Pat. No. 3,659,876, a trailer hitch is disclosed which has a cylindrical socket that locks down over a trailer hitch ball that is secured to the load bed of a pickup truck.

U.S. Pat. No. 3,433,503 discloses a trailer coupler having a socket on a goose neck carried by the trailer. The socket locks down over the hitch ball which is mounted to the bed of the pickup truck.

U.S. Pat. No. 4,256,324 discloses a retractable trailer hitch mounted in a truck bed that is recessed within the load bed of a pickup truck in a subframe secured to only the bed portion of the pickup truck.

Applicant's universal trailer hitch assembly has an under load bed support frame secured to the frame of the pickup truck in combination with a reinforcing plate secured on top of the load bed and to the support frame providing a universal socket into which a variety of trailer hitch pin or ball configurations can be positioned. The trailer hitch support frame is adjustable and can be mounted under the load bed of the pickup truck without having to raise the bed.

SUMMARY OF THE INVENTION

Figure 1:
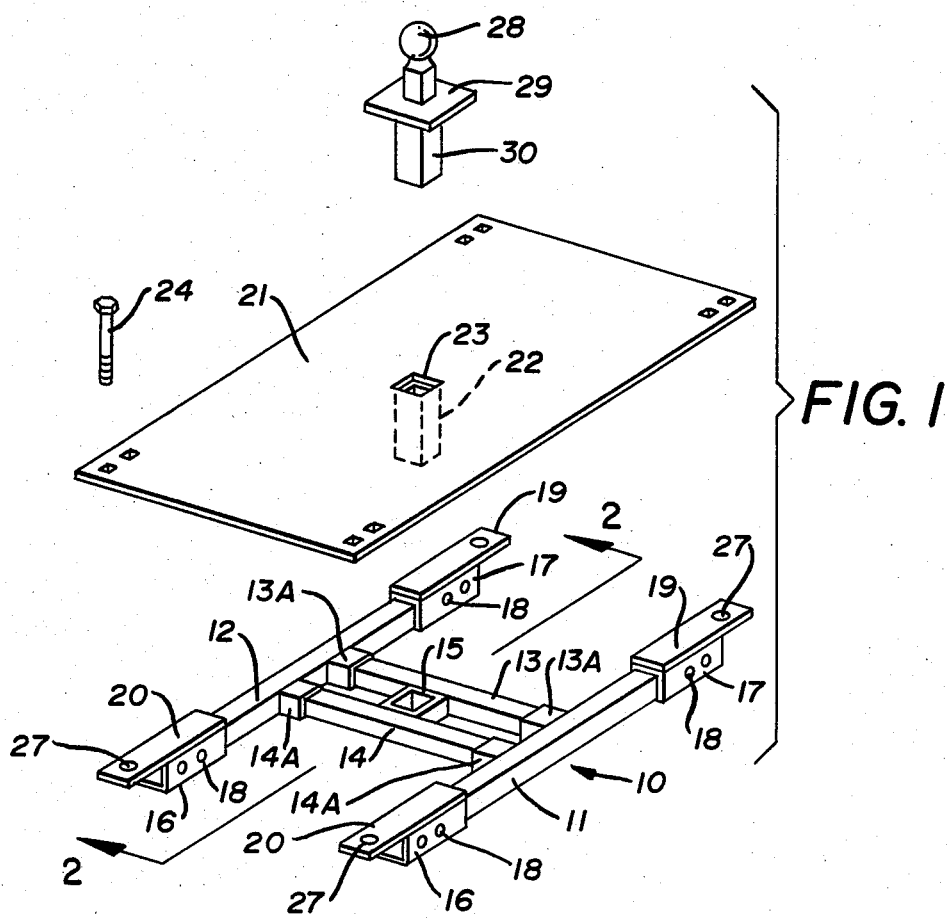
FIG. 1 is a perspective exploded view of the trailer hitch assembly.

A universal trailer hitch assembly for use on a pickup truck that is adjustably secured to the truck via the frame and the load bed to provide a universal mounting system for a variety of hitch pins and/or balls. The system does not require removal of the load bed or fabrication of mounting brackets due to its unique adjustable configuration which can be bolted in place. The hitch assembly provides a positive locking latch for engagement with the hitch ball that is readily accessible to the user.

DESCRIPTION OF THE PREFERRED EMBODIMENT

A universal trailer hitch assembly that can be readily mounted to a pickup truck comprises a main support frame 10 defining a pair of spaced parallel tubular members 11 and 12 and a pair of spaced cross support tubular members 13 and 14 removably secured therebetween. The cross support members 13 and 14 extend from and register with sockets 13A and 14A which are affixed in spaced pairs on each of said tubular members 11 and 12. A hitch support 15 is secured between said cross tubular support members 13 and 14 midway along their lengths. The opposite end portions of said tubular members 11 and 12 are apertured and have sliding sleeves 16 and 17 positioned thereon. The sliding sleeves 16 and 17 have pairs of transversely disposed apertures 18 in alternate registering alignment with said apertures in said tubular members and provide for adjustably positioning said sleeves thereon.

Figure 2:
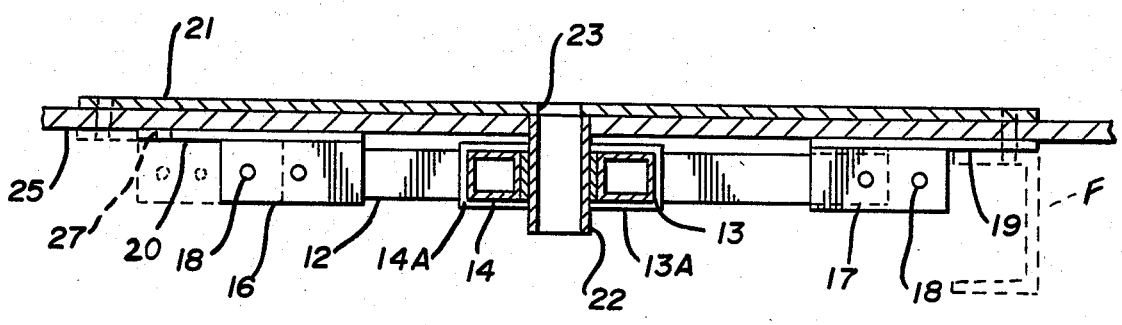
FIG. 2 is a cross section on lines 2—2 of FIG. 1.

Rectangular brackets 19 and 20 are secured to the uppermost portion of said sliding sleeves 16 and 17 and extend outwardly thereover. A reinforcing bed plate 21 is generally rectangular with a hitch support sleeve 22 secured to the center portion thereof with an aligned aperture 23 therein. Pairs of spaced apertures are formed in the corners of said plate 21 to provide adjustable mounting positions that correspond to and align with said mounting support frame 10 so that fasteners 24 can secure said reinforcing bed plate 21 to a truck bed 25 and a truck frame F, see FIG. 2 of the drawings, by passing through the same and aligned apertures 27 in the end of said brackets 19 and 20 on said tubular members 11 and 12.

A trailer hitch 28 is secured to a base plate 29 having a post 30 extending therefrom. The post 30 is of a smaller outer diameter than that of the inner diameter of said hitch support sleeve 22.

Figure 3:
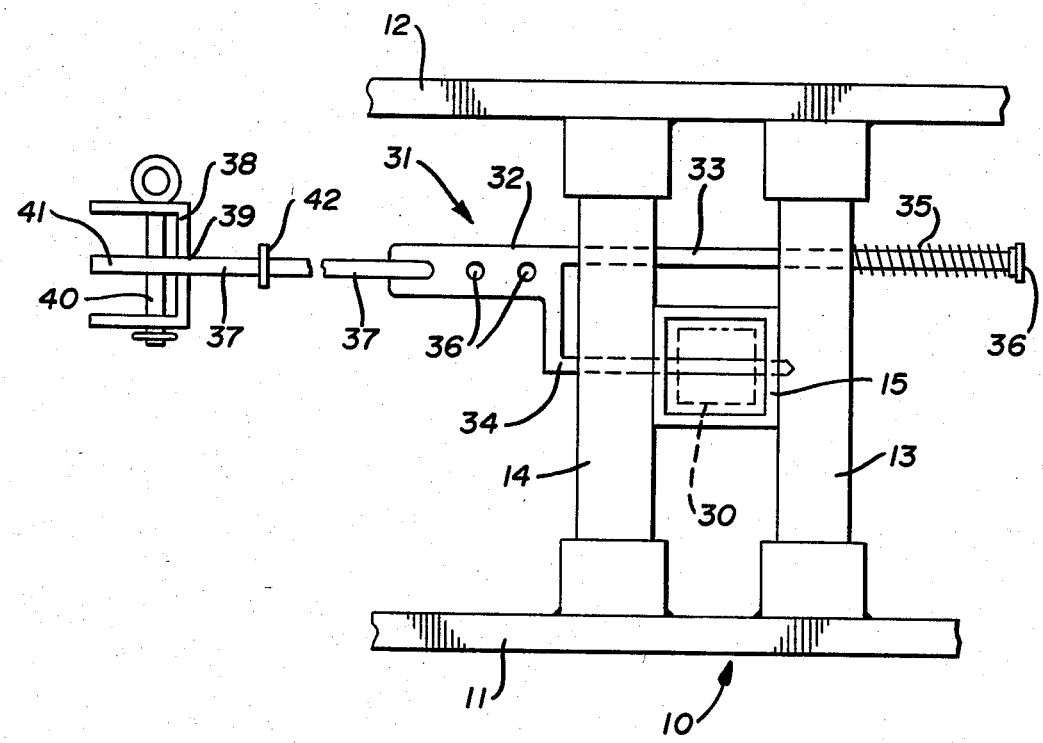
FIG. 3 is a top plan view of a lock assembly on the trailer hitch assembly.
Figure 4:
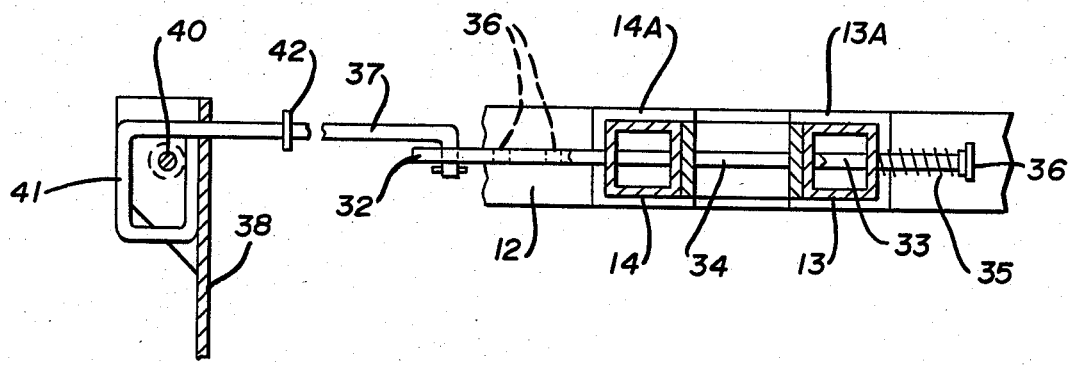
FIG. 4 is a side elevation with portions broken away of the lock assembly.

Referring now to FIGS. 3 and 4 of the drawings, a safety hitch latch 31 can be seen positioned on the cross support members 13 and 14 of the main support frame 10. The safety latch 31 has a main member 32 which is bifurcated into a guide rod 33 and a hitch engagement pin 34. The guide rod 33 extends through apertures in said cross support members 13 and 14 and has a spring 35 positioned over its free end between said cross member 13 and a spring stop 36. The hitch engagement pin 34 extends through said cross member 14, the hitch support socket 15, and the trailer hitch post 30 shown in broken lines into the cross support member 13 securing the trailer hitch 28 within. The safety latch main member 32 defines a plurality of openings 36 within that can be selectively engaged by a control rod 37 which extends outwardly from under said pickup truck loading bed to a latch lock bracket 38 accessible to the user of the device. The latch lock bracket 28 is generally U-shaped and is apertured at 39 for the control rod 37. A locking pin 40 extends through the latch lock bracket 38 and secures a handle 41 formed on the end of the control rod 37 from accidental movement. The control rod 37 has a travel stop 42 adjacent the latch lock bracket 38 to restrict the travel of said rod, the outer edge of which is engaged in one of the openings 36 in the main member 32 which will be well understood by those skilled in the art.

It will be readily apparent from the above description that the universal trailer hitch can be easily mounted to a variety of truck frames without removing the load bed or the fabrication of special brackets and modifying the load bed as is presently required.

In use, the main support frame 10 can be adjustably positioned to the frame of the pickup truck with the reinforcing bed plate 21 secured on the load bed 25 by the plurality of fasteners 24, as hereinbefore described. A trailer hitch 28 can then be positioned through the reinforcing bed plate 21 and the hitch support sleeve 22 which in turn is slidably positioned within the hitch support socket 15 transferring the bearing load of a trailer, not shown, to the cross support tubular members 13 and 14 and the parallel tubular members 11 and 12 which are securely fastened to the frame of the truck.

It will be readily understood that the trailer hitch 28 can be interchangeable in that different configurations of the hitch as would be required for different types of trailer towing can easily be positioned within the universal trailer hitch and of course the trailer hitch 28 can also be removed so that full utilization of the pickup truck load bed can be realized when a trailer is not being towed.

It will thus be seen that a new and useful universal trailer hitch assembly has been illustrated and described and it will be apparent to those skilled in the art that various changes and modifications may be made therein without departing from the spirit of the invention and having thus described my invention what I claim is:

1. A universal trailer hitch assembly to be positioned to a frame of a pickup truck comprising a main support frame including at least two spaced parallel tubular members, cross support members, means for securing said cross support members to said spaced parallel tubular members, a hitch support secured to said cross support members, movable sleeves on the ends of said spaced parallel tubular members, a bracket on each of said sleeves for securing the same to said frame of the pickup truck and to a truck bed, a reinforcing bed plate secured to said main support frame, means for securing said reinforcing bed plate to said truck bed and said main support frame and to said truck frame, a trailer hitch movably secured within said hitch support, means for selectively locking said trailer hitch within said hitch support.

2. The universal trailer hitch assembly of claim 1 wherein said means for securing said cross support members to said spaced parallel tubular members comprises sockets on said spaced parallel tubular members.

3. The universal trailer hitch assembly of claim 1 wherein said hitch comprises a base plate having a post extending therefrom.

4. The universal trailer hitch support of claim 1 wherein said reinforcing bed plate is apertured and has a hitch support sleeve aligned with said aperture.

5. The universal trailer hitch assembly of claim 1 wherein said means for selectively locking said trailer hitch within said hitch support comprises a bifurcated main member having a guide rod and a hitch engagement pin, a control rod selectively engaged in said bifurcated main member, a latch lock bracket, a locking pin in communication with said latch lock bracket and said bifurcated main member, means for resiliently urging said hitch engagement pin into locking relation through said hitch support.

* * * * *